US006997235B2

(12) United States Patent
Zelleröhr et al.

(10) Patent No.: US 6,997,235 B2
(45) Date of Patent: Feb. 14, 2006

(54) PLASTICIZING BARREL LINED ON THE INSIDE WITH A COATING, AND METHOD OF MAKING SUCH A PLASTICIZING BARREL

(75) Inventors: Michael Zelleröhr, Kleve (DE); Martin Würtele, Friedberg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 183 days.

(21) Appl. No.: 10/361,781

(22) Filed: Feb. 10, 2003

(65) Prior Publication Data

US 2003/0173710 A1    Sep. 18, 2003

(30) Foreign Application Priority Data

Feb. 14, 2002   (DE)   ................... 102 06 169

(51) Int. Cl.
   *B22D 19/08*   (2006.01)
   *B22D 23/06*   (2006.01)
   *B22D 13/00*   (2006.01)
(52) U.S. Cl. .................. 164/138; 164/33; 164/80; 164/98; 164/114
(58) Field of Classification Search ............... 164/114, 164/286, 302, 80, 98, 33, 138
See application file for complete search history.

(56) References Cited

U.S. PATENT DOCUMENTS

| 3,587,720 | A | * | 6/1971 | Bade .......................... 164/302 |
| 4,439,041 | A | * | 3/1984 | Schaeffer et al. ........... 366/144 |
| 4,766,042 | A |   | 8/1988 | Otani ......................... 428/679 |
| 4,863,661 | A |   | 9/1989 | Maddy ....................... 264/127 |
| 5,221,821 | A | * | 6/1993 | Burns et al. ........... 219/121.14 |
| 5,565,277 | A | * | 10/1996 | Cox, Jr. et al. ............. 428/679 |
| 6,197,437 | B1 | * | 3/2001 | Bielec et al. ............... 428/627 |

FOREIGN PATENT DOCUMENTS

| DE | 33 22 225 A | 1/1985 |
| DE | 42 26 350 A | 3/1993 |
| EP | 0 397 625 A2 * | 11/1990 |
| EP | 1 036 611 A | 9/2000 |
| JP | 61 216846 A | 9/1986 |
| JP | 2002036033 A | 2/2002 |

* cited by examiner

Primary Examiner—Kevin P. Kerns
(74) Attorney, Agent, or Firm—Henry M. Feiereisen

(57) ABSTRACT

A plasticizing barrel for a plastics processing machine includes a body having a hollow cylindrical configuration and defining an axis; and a coating formed on an inner wall surface of the body and including at least one groove extending in axial direction of the body. The coating, e.g., a wear-resisting protective layer, may be produced through centrifugal casting, whereby the grooves are formed by projections of a negative mold inserted in the hollow-cylindrical body.

17 Claims, 4 Drawing Sheets

PLASTICIZING BARREL LINED ON THE INSIDE WITH A COATING, AND METHOD OF MAKING SUCH A PLASTICIZING BARREL

CROSS-REFERENCES TO RELATED APPLICATIONS

This application claims the priority of German Patent Application, Serial No. 102 06 169.6-16, filed Feb. 14, 2002, pursuant to 35 U.S.C. 119(a)–(d), the disclosure of which is incorporated herein by reference.

BACKGROUND OF THE INVENTION

The present invention relates, in general, to a plasticizing barrel, and to a method of making such a plasticizing barrel.

Plasticizing barrels are used to plasticize granular plastic material in an injection assembly or an extruder by means of a screw for a subsequent injection process. As the inner wall of the plasticizing barrel is subject to great stress during plasticizing, it has been commonly proposed to line the inner wall with a wear-resisting coating. The application of such a wear-resisting coating may be implemented by a so-called centrifugal casting process in which metallic powder is introduced into a rotating hot hollow-cylindrical body, pressed against the inner barrel wall as a consequence of centrifugal forces, and melted there. After a cool-down period, the thus produced layer on the inside wall exhibits a fairly good surface quality and requires only little finishing works.

When more powerful plasticizing units are involved, barrels with grooves are required whereby the grooves extend almost over the entire length of the plasticizing barrel. These barrels do not have a wear-resisting protective layer; rather, barrel blanks are formed in "soft state" with the grooves, and subsequently the inner barrel wall is hardened by a nitriding process.

It is also known to place so-called grooved bushings in the feed zone of plasticizing units for improving the transport of introduced raw plastic material. These grooved bushings are normally also coated for wear-resistance, e.g., through a high-temperature isostatic pressing process. The wear-resisting protective layer of the grooved bushing can be provided either directly into the plasticizing barrel, or the grooved bushing can be produced separately and subsequently placed into the plasticizing barrel. This process is applicable only for relatively short grooves.

It would therefore be desirable and advantageous to provide for a plastics processing machine an improved plasticizing barrel which obviates prior art shortcomings and which includes an inner coating and exhibits on its inner wall a groove or grooves.

It would also be desirable and advantageous to provide an improved method of making such a plasticizing barrel.

SUMMARY OF THE INVENTION

According to one aspect of the present invention, a plasticizing barrel for a plastics processing machine includes a hollow cylindrical body, and a coating which lines an inner wall surface of the body and is formed with at least one groove extending in axial direction of the body.

The present invention resolves prior art problems by forming the groove or grooves completely in the inner coating itself rather than in the hollow cylindrical body. Suitably, the provision of the groove in the inside coating can be realized by a centrifugal casting process, whereby an axially extending negative mold, formed with axial projections, is placed in the hollow-cylindrical body, and, after carrying out the centrifugal casting process, is removed again. According to an alternative process, the centrifugal casting process may also be carried out in two stages by initially applying a smooth layer on the inner wall of the hollow cylindrical body through centrifugal casting in the absence of a negative mold, and subsequently carrying out the centrifugal casting process with the negative mold. The negative mold may be held in axial centered disposition in the hollow-cylindrical body. However, this centering step may be omitted altogether, when the initial smooth layer is applied at very exact dimensions so that the negative mold is already in centered disposition, when placed into the hollow-cylindrical body.

A smoothest possible surface of the areas between the grooves may be realized when the layer has a thickness which is smaller than the height of the projections in radial direction. In the two-stage process described above, the smooth inner layer may be honed in the regions in which the projections are situated so as to realize smooth groove bases in a simple manner. Of course, the entire inner coating may be honed as well.

According to another aspect of the present invention, a negative mold for use in a method of making a plasticizing barrel for a plastics processing machine, may include a base body formed with axial projections and defined by a diameter which is smaller than an end inner diameter of the coated plasticizing barrel. The base body may be cylindrical, and the projections may be part of a cage.

According to another feature of the present invention, the projections may be coated with an adhesion-reducing layer and/or wear-reducing layer to facilitate a removal of the negative form. As an alternative, it is, of course, also conceivable to so configure the projections in the direction in which the negative mold is removed from the coated hollow-cylindrical body as to have increasing width in circumferential direction and/or increasing height in radial direction.

According to another feature of the present invention, the projections may have a helical configuration. As a consequence, the negative mold can then be withdrawn from the hollow-cylindrical body through a twisting motion.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7b is a fragmentary, perspective view of the cage of FIG. 7a;

DETAILED DESCRIPTION OF PREFERRED EMBODIMENTS

Figure 1:
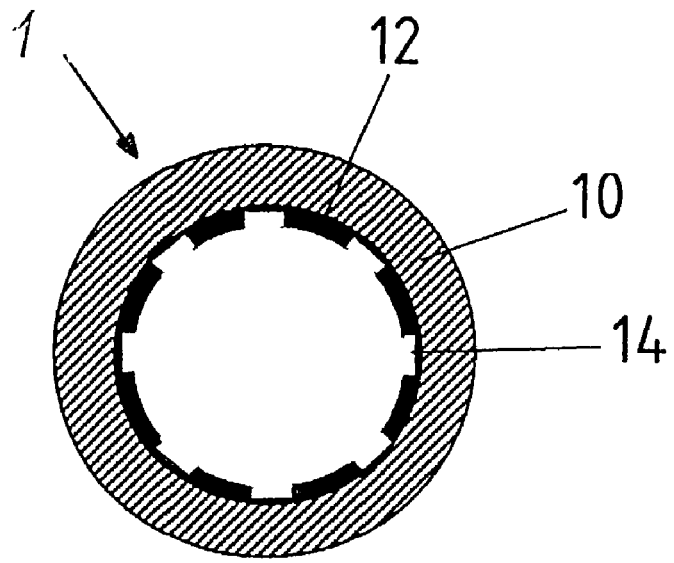
FIG. 1 is a schematic, cross sectional view of a plasticizing barrel according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic, cross sectional view of a plasticizing barrel according to the present invention, generally designated by reference numeral 1 and including a hollow-cylindrical body 10 having an inner wall lined with a coating 12, e.g. a wear-resisting protective layer, which is formed with grooves 14.

Figure 2:
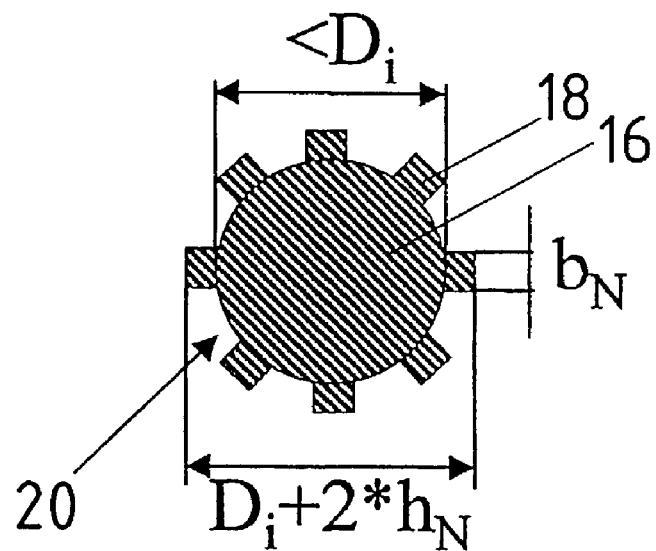
FIG. 2 is a schematic, cross sectional view of a negative mold according to the present invention.
Figure 10:
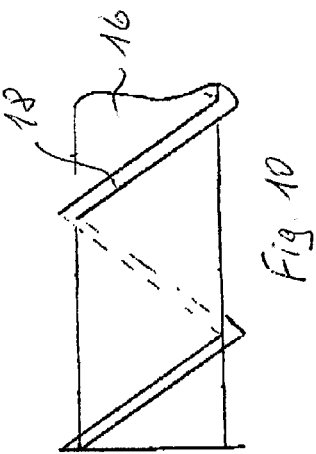
FIG. 10 shows a schematic view of another variation of a negative mold.

Manufacture of the plasticizing barrel 1 according to the present invention involves the use of a negative mold, as shown in FIG. 2 and generally designated by reference numeral 20. The negative mold 20 has a cylindrical base body 16 which is formed with radial projections 18 about its perimeter. The projections 18 extend in axial direction along the surface of the base body 16 and may jut out in straight configuration, i.e. in axis-parallel relationship to the base body 16, or may have a helical configuration, i.e. extending around the surface of the base body 16, as shown in FIG. 10. As indicated in FIG. 2, the base body 16 has a diameter which is smaller than an inner diameter $D_i$ of the finished plasticizing barrel 1. The outer diameter of the negative mold 20, i.e. the diameter of the inner circle which connects the projection and outer surface is $D_i+2*h_N$, wherein $h_N$ is the height of the groove to be provided. $B_N$ represents the width of the projections 18, i.e. width of the grooves to be provided.

Figure 3:
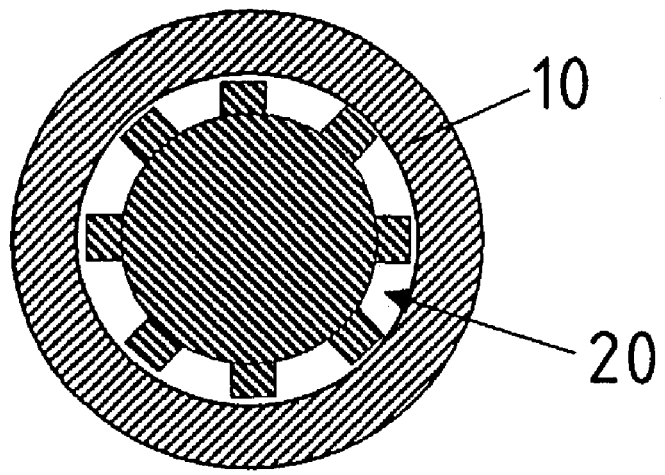
FIG. 3 is a schematic, cross sectional view of the hollow-cylindrical body with inserted negative mold for making the plasticizing barrel of FIG. 1.
Figure 4:
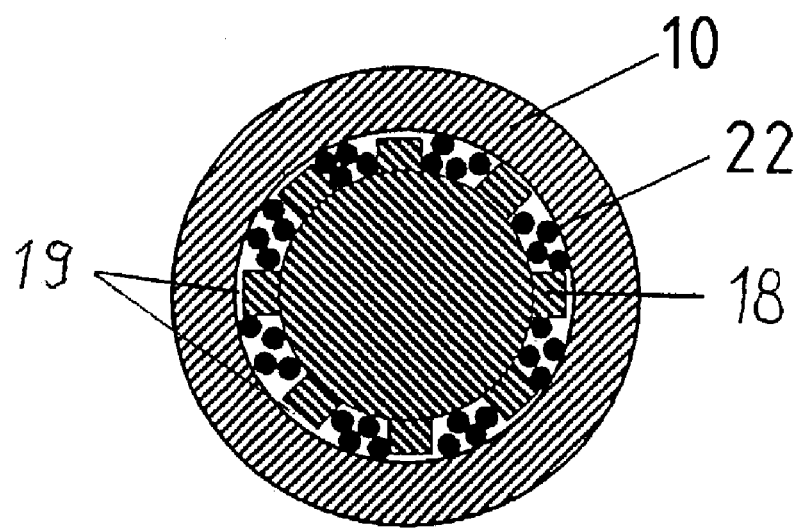
FIG. 4 is a schematic, cross sectional view of the hollow-cylindrical body with inserted negative mold and introduction of material into the hollow-cylindrical body at a process stage before centrifugal casting.
Figure 5:
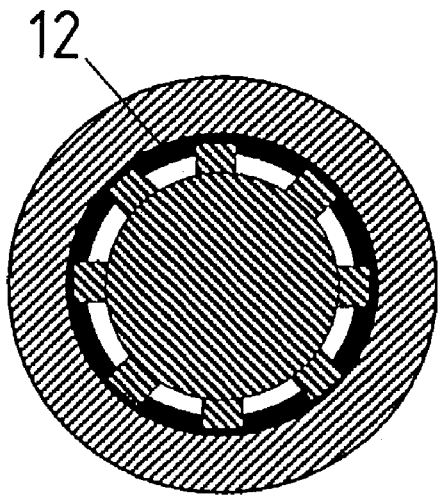
FIG. 5 is a schematic, cross sectional view of the hollow-cylindrical body with inserted negative mold after centrifugal casting.

The negative mold 20, shown in FIG. 2, is placed into the hollow-cylindrical body 10 which has an inner diameter which is greater than the inner diameter $D_i$ of the finished plasticizing barrel 1 by twice the thickness of the finished coating 12, as shown in FIG. 3. Subsequently, metal powder 22 or other liquid melt is introduced into the intermediate spaces between the projections 18, as shown in FIG. 4. The hollow-cylindrical body 10 with negative mold 20 and metal powder 22 is then subjected to a centrifugal casting process, i.e. the hollow-cylindrical body 10 with negative mold 20 and metal powder 22 are heated and caused to carry out an axial rotation. As a result, the metal powder 22 melts and lines the inner wall surface of the hollow-cylindrical body 10 and migrates also into gaps 19 between the projections 18 and the inner wall surface, as shown in FIG. 5 to form the coating 12. Subsequently, the negative mold 20 is removed from the hollow-cylindrical body 10 by being pulled out, when straight projections 18 are involved, or by twisting, when the projections 18 have a helical configuration. As a result of the removal of the negative mold 20, grooves 14 are formed in the area where the projections 18 have previously been situated, as shown in FIG. 1. If need be, the inner contour of the plasticizing barrel 1 may be finished by honing (precision grinding).

Of course, the metal powder 22 or liquid melt may also be introduced during the centrifuging process.

Figure 6:
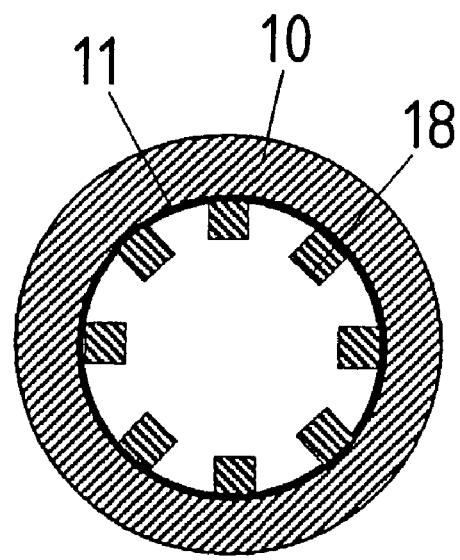
FIG. 6 is a schematic, cross sectional view of a hollow-cylindrical body with negative mold in an intermediate step of a variation of a method according to the present invention
Figure 7B:
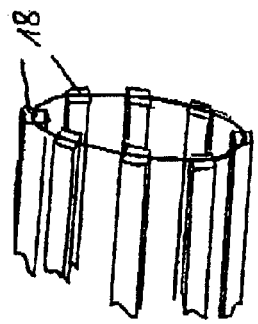
Figure 7A:
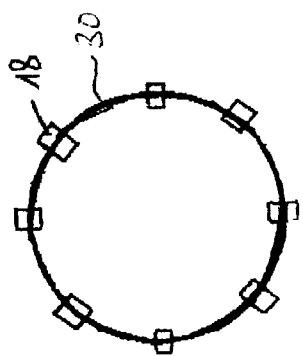
FIG. 7a is a plan view of a cage for making a plasticizing barrel according to the present invention.

An alternative to the afore-described manufacturing process of the plasticizing barrel 1 involves the application of a two-step process to make the coating 12. As shown in FIG. 6, the inner wall surface of the hollow-cylindrical body 10 is lined initially with a coating 11, e.g. a wear-resisting protective layer, of constant thickness, preferably, through centrifugal casting, with the coating 11 having an inner diameter of $D_i+2h_N$. Subsequently, the negative mold 20 or a cage carrying the projections 18, is inserted in the interior of the hollow-cylindrical body 10. An example of a suitable cage is shown in FIGS. 7a and 7b and involves the arrangement of two end rings 30 (only one is shown here) between which the projections 18 are secured. Thereafter, metal powder 22 is introduced into the intermediate spaces between the projections of the negative mold (or centrally into the hollow space of the cage), and the hollow-cylindrical body 10 with coating 11 and the negative mold 20 are subjected to a further centrifugal casting process to form the coating 12 with an inner diameter $D_i$ and with the grooves 14 in a manner described in conjunction with the previous embodiment. Suitably, the areas of the initial coating 11 where the projections 18 are situated are honed, before the negative mold 20 or the cage are placed into the hollow-cylindrical body 10 so that the finished plasticizing barrel 1 has very smooth groove bases.

In this variation of the process according to the present invention, the initial coating 11 is thick enough to allow the projections 18 to automatically bear against the coating 11 so that the need for a separate centering of the negative mold 20 or the cage is eliminated.

The negative mold 20 or cage may be used repeatedly. After a number of uses, finishing works, such as polishing, coating, may be suitable.

Since the diameter of the base body 16 of the negative mold 20 is smaller than the inner diameter $D_i$ of the finished plasticizing barrel 1, i.e. the groove height $h_N$ is smaller than the height of the projections 18, the surface of the coating 12 between the grooves 14 is ensured to have a very even and smooth configuration as a consequence of the centrifugal forces.

Depending on the stress the plasticizing barrel 1 is subjected, various alloys may be used as protective layer. These alloys are known to the person skilled in the art so that a detailed description thereof is omitted for the sake of simplicity.

Figure 9A:
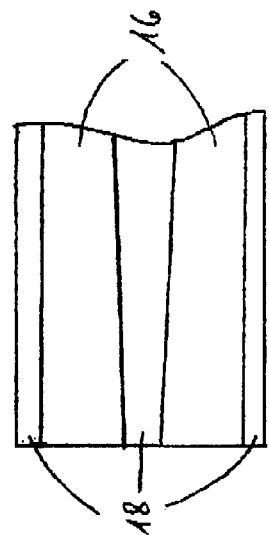
FIGS. 9a, 9b show schematic views of modified configurations of projections of the negative mold.
Figure 9B:
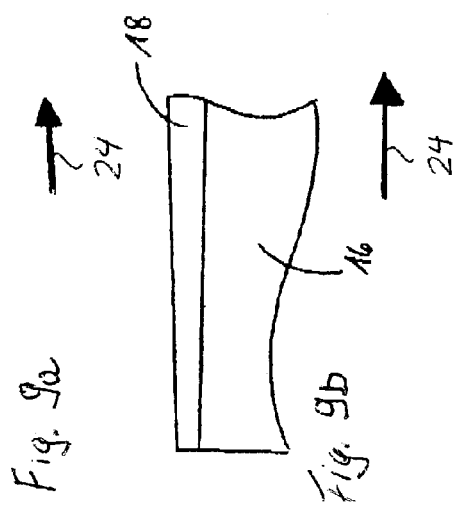
Figure 8:
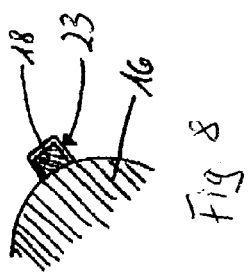
FIG. 8 is a cutaway, sectional view of the negative mold with projections lined with another layer.

As shown in FIG. 8, the projections 18 of the negative mold or cage may be coated with an adhesion-reducing layer and/or wear-reducing layer, as indicated by reference numeral 23. As an alternative, it is, of course, also conceivable to configure the projections 18 in the direction in which the negative mold 20 is removed from the coated hollow-cylindrical body 16, indicated by arrow 24, so as to have increasing width in circumferential direction, as shown in FIG. 9a, and/or increasing height in radial direction, as shown in FIG. 9b.

Although, centrifugal casting is a currently preferred process to make a plasticizing barrel 1 according to the present invention, other forming process may also be applicable, without departing from the spirit of the present invention. Other forming processes may involve, however, also different dimensioning of the negative mold.

While the invention has been illustrated and described in connection with currently preferred embodiments shown and described in detail it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method of making a plasticizing barrel for a plastics processing machine, comprising the step of forming on an inner wall surface of a hollow cylindrical body a coating for lining the inner wall surface of the hollow cylindrical body by placing in the body a negative mold extending in a longitudinal direction and formed with at least one axial projection, subjecting the body and the negative mold to a centrifugal casting process while introduced coating material melts and propagates, allowing the material to cool down to form a coating, and removing the negative mold, thereby establishing at least one groove extending in the coating in a longitudinal direction of the body.

2. The method of claim 1, wherein the coating is a wear-resisting protective layer.

3. The method of claim 1, wherein the coating material is introduced before the centrifugal casting process.

4. The method of claim 1, wherein the coating material is introduced during the centrifugal casting process.

5. The method of claim 1, wherein the forming step includes the step of forming the hollow-cylindrical body through centrifugal casting with a preliminary coating of constant thickness, before placing the negative mold in the hollow cylindrical body.

6. The method of claim 5, and further comprising the step of honing the preliminary coating at least in areas where the projections are arranged, before insertion of the negative mold.

7. The method of claim 1, wherein the negative mold is centered in axial disposition in the hollow-cylindrical body.

8. The method of claim 1, wherein the centrifugal casting process results in an application of the coating at a thickness which is smaller than a radial height of the projections of the negative mold.

9. The method of claim 1, and further comprising the step of honing one of the areas selected from the group consisting of an entire inner surface of the coating and a region between grooves.

10. The method of claim 1, wherein the negative mold is reusable.

11. The method of claim 1, wherein the at least one groove has a helical configuration.

12. The method of claim 1, wherein the negative mold has a base body diameter which is smaller than an inner diameter of the hollow cylindrical body lined with the coating on the inner wall surface.

13. The method of claim 1, wherein the negative mold has an outer diameter which is smaller than an inner diameter of the hollow cylindrical body by twice a thickness of an applied coating material.

14. The method of claim 1, wherein the negative mold has a cylindrical configuration.

15. The method of claim 1, further comprising the step of lining a surface of the projection of the negative mold with at least one coating selected from the group consisting of adhesion-reducing coating and wear-reducing coating.

16. The method of claim 1, wherein the negative mold has plural projections to form plural grooves in the coating, said projections having a configuration selected from the group consisting of increasing width in circumferential direction and increasing height in radial direction.

17. The method of claim 1, wherein the negative mold has plural projections to form plural grooves in the coating, said projections having a helical configuration.

* * * * *